United States Patent Office 3,124,541
Patented Mar. 10, 1964

3,124,541
PROCESS FOR THE PREPARATION OF SILICA-ALUMINA CRACKING CATALYSTS
Charles P. Wilson, Jr., Cincinnati, Ohio, and Frank G. Ciapetta, Silver Spring, and John B. Jones, Baltimore, Md., assignors to W. R. Grace & Co., New York, N.Y., a corporation of Connecticut
No Drawing. Filed Nov. 14, 1960, Ser. No. 68,672
4 Claims. (Cl. 252—453)

This invention relates to silica-alumina catalysts and to a process for preparing silica-alumina composites suitable for use as petroleum cracking catalysts. In one particular aspect it relates to the preparation of such catalysts by a cogelation process wherein the silica-alumina component contains about 25% active alumina.

In the catalytic cracking of hydrocarbon oils, oil stock is vaporized by heating at a temperature of 800–1000° F. at greater than atmospheric pressure. The hydrocarbon vapors are intimately contacted with the silica-alumina catalyst wherein the high boiling constituents are converted into gasoline. Several complex side reactions take place simultaneously with the cracking reaction such as polymerization, alkylation and the like. As a result of these reactions, a carbonaceous deposit referred to in the art as "coke" is formed on the surface of the catalyst. This deposit severely impairs the cracking efficiency of the catalyst. Catalytic activity is restored by burning the deposit from the catalyst surface in a stream of oxidizing gas and the catalyst is returned to the cracking process. Such regeneration is usually carried out at temperatures above cracking temperature. The catalyst regeneration is exothermic and excessive heat is also developed during this stage of the process.

It is known that short life and decreasing catalytic activity is due to the lack of heat and steam stability of the catalyst and occurs during the cracking process and in the regeneration stage. It is important, therefore, that the catalyst be relatively heat stable. Heat stabiliy is paricularly important in fluid cracking systems which employ finely divided solid catalysts. Thus with the high degree of turbulence necessary in a fluid system the catalyst undergoes physical deterioration with the production of a substantial quantity of fines. These fines are difficult to retain within the system and represent a loss which often cannot be tolerated. Research to develop catalysts which have a greater mechanical strength and longer operating life was directed toward increasing the active alumina content in a silica-alumina catalyst to about 20–40%, preferably about 25%.

The present invention is concerned with the preparation of cracking catalysts from alkali metal silicate solutions having a silica to alkali metal ratio of 3:1 to 3.4:1. These catalyst contain about 20–30% active alumina. The active alumina is deposited in the catalyst by cogelation of the sodium silicate with an alum solution that has been treated to increase the amount of active alumina that will be deposited in the precipitation step.

Briefly, the process of this invention comprises providing an alkali metal silicate solution, commingling with the solution a slurry containing alumina salts and unreacted aluminum hydrate in which the ratio of negative ions to alumina expressed as $Al_2O_3$ is less than 3:1 and at least 1.5:1, hereinafter referred to as an aluminous slurry, in an amount sufficient to react with the alkali metal silicate to cogel the silica and alumina. The composite is purified and dried to give a final catalyst having about 25% by weight active alumina.

The active alumina content of the final product is controlled by adding aluminous slurry to increase the alumina content of the catalyst to about 25%. The manner in which this aluminous slurry is prepared may be varied. Thus aluminum hydrate may be reacted with a lesser quantity of sulfuric acid than is required to give a 3:1 mole ratio of sulfate to alumina found in normal alum; sulfuric acid may be added to a water slurry of aluminum hydrate; dry aluminum hydrate may be added to sulfuric acid; or aluminum hydrate may be added to an alum solution.

The term "active" as related to alumina refers to catalytic cracking activity. The minimum amount of active alumina which can be tolerated is about 7.5% and the maximum about 45%.

In the preparation of the cracking catalyst by our novel process the sodium silicate is reacted with the aluminous slurry to form a cogel and thus eliminate the need for use of a larger quantity of an extraneous precipitating agent. In our process the necessity for adding a large quantity of alkali which would be required to precipitate the alumina is eliminated by the addition of aluminum trihydrate to the alum or to the sodium silicate. Our process represents the most economical method possible and practical for the production of cracking catalysts in which the catalyst contains 25% active alumina. This is accomplished by cogelation of the sodium silicate solution with alum to which free unreacted aluminum trihydrate has been added.

A small amount of ammonia is normally used to adjust the pH after the cogelation step. However, this addition may be eliminated entirely without undue effect on the quality of the final product in any one of four systems. Thus the pH of the filter fed slurry may be reduced by using less aluminous slurry or the pH may be be maintained at 5.8 and lesser amounts of aluminous slurry used. The ratio of alumina derived from alum to the ratio of free hydrate may be changed or the sodium silicate used may have a slightly lower $SiO_2$ to $Na_2O$ ratio than the 3.3:1 silicate normally used.

In carrying out the process for the present invention there is first provided an aqueous alkali metal silicate solution having a silica to alkali metal ratio of about 3:1 to 3.4:1. While the process may be carried out with any of the alkali metal silicates, sodium silicate will generally be employed because it is less costly than the other silicates. For purposes of simplicity, therefore, the invention will be described with reference to the use of sodium silicate. After the silicate solution has been prepared it is heated to obtain an intimate dispersion of the components. Temperature control is very important in cogelation processes so the system is maintained at about 80–150° F.

To the silicate solution there is then added an aluminous slurry while the combined mass is stirred vigorously. Alum has been referred to in describing the process of this invention. Suitable salts used to furnish the active alumina present in the catalyst are the salts of the strong mineral acids such as aluminum sulfate, aluminum nitrate, aluminum chloride, etc. Aluminum sulfate (alum) is considerably cheaper than the other aluminum salts and thus is the preferred reactant.

An important limitation of our process resides in the selection of the aluminum hydrate. Hydrates of aluminum as marketed commercially vary widely in both physical and chemical properties. Whether the hydrate be completely or partially dissolved in sulfuric acid prior to use in the preparation of our cracking catalyst, chemical purity requires a product that has a maximum of 0.05% iron and 0.20% $Na_2O$. Other metal impurities are not normally found in commercial hydrates. Another important limitation is particle size distribution when the hydrate is introduced into the slurry as free hydrate. Coarse particles are objectionable for several reasons and cannot be tolerated in the finished product. The particle size of the hydrate used in our process was as follows: 2 to 5% +100 mesh and 60 to 75% +200 mesh. Essentially all (90–97%) of the hydrate was retained on a 325 mesh screen with 3–10% passing through the screen as fines. The particle size of the hydrate is, of course, not critical if the hydrate is of such soft character that size reduction occurs during processing.

The aluminous slurry prepared by one of the methods described above and containing a sulfate to alumina ratio of 1.5:1 is sufficient to completely react with the sodium silicate present in the mixture and give a pH of about 5. Cogelation of the silica solution with the aluminum hydrate mixture occurs at a pH of about 4.1. The pH of the mixture should be about 5.8 to give the best product and to reduce loss in the washing step. The pH adjustment may be effected by addition of ammonia or by one of the methods discussed previously.

Following cogelation the slurry is filtered to remove the silica-alumina composite which is then dried, washed and redried. The washing and drying are purely mechanical processes and the order may be varied. The filtered material may be washed prior to drying and the washed material spray dried to form silica-alumina microspheres. Washing is generally carried out with a heated dilute ammonium sulfate solution followed by a rinse with deionized water. The final drying is generally done at about 300° F.

The invention is further illustrated by the following specific but non-limiting example.

EXAMPLE I

A total of 15 gallons of a solution of dilute sodium silicate was prepared in a tank equipped with a stirrer and a centrifugal pump. The sodium silicate contained 14.88 g. per liter of $Na_2O$ and 49 g. per liter of $SiO_2$. The temperature in the mixture was raised to 120° F. by means of a hot water jacket.

An aluminous slurry was prepared as follows: A charge of 725 g. of aluminum hydrate was completely dissolved in sulfuric acid and diluted with water so that the aluminum sulfate concentration expressed as $Al_2O_3$ was 95 g. per liter with a slight excess of sulfuric acid amounting to 12 g. per liter of $H_2SO_4$. A total of 725 g. of coarse aluminum trihydrate was added to alum solution with vigorous stirring. The silicate solution and the aluminum hydrate mixture were cogelled by adding 4500 ml. of aluminous slurry to the silicate solution maintained at a temperature of 120° F. The mixture gelled at a pH of 4.1. An additional 450 ml. of the aluminous slurry were added after gelation had occurred. The gelled product was mulled for 15 minutes and then 1 liter of 15% ammonia solution was added to adjust the pH from 3.6 to 5.8. The temperature was increased to 125° F. and the slurry filtered. A 15 lb. portion of the filter cake was reslurried with 750 ml. of water and a very viscous slurry was obtained which was fed to the spray drier. The spray dried product was washed with a 4° Baume ammonium sulfate solution having a pH of 4.7 and then rinsed with distilled water heated to a temperature of 130° F. and adjusted to pH 9.0 with ammonia to remove the soda and sulfate impurities. The product was dried at 300° F.

In order to determine the catalytic cracking activity and stability of the silica-alumina cracking catalyst, a test was devised to simulate conditions prevalent during use of the catalyst. The test involves compressing a sample of fresh catalyst into pellets and splitting the compressed pellets into two portions, one for thermal deactivation and one for steam deactivation. Thermal deactivation is carried out in two muffle furnaces, the first at a temperature of 1500° F. and the second at a temperature of 1700° F. The sample is moved from the low temperature to the high temperature furnace and remains in each for three hours. Steam deactivation is carried out first at atmospheric pressure and in the absence of steam by holding the catalyst for five hours at 400° F. and then three hours at 1050° F., followed by treatment in an atmosphere of steam at 60 p.s.i.g. and 1050° F. for 24 hours. Activity of the catalyst prepared in accordance with the procedure described above was determined.

In carrying out the activity test, 200 ml. of deactivated catalyst was placed in a reactor and maintained at a temperature of 850° F. During a period of two hours, 238.2 ml. of virgin East Texas light gas oil, having a boiling point in the range of 500–700° F., was passed over 200 ml. of the deactivated pelleted catalyst at a rate of 120 ml. per hour, which is equivalent to a space velocity of 0.6 ml. of oil per ml. of catalyst per hour. The hot products were recovered and separated. The fraction distilled below 400° F. as well as gas and loss were determined and designated as the distillate plus loss, or more simply, D+L. The results of these tests are as follows:

Table I

Steamed activity after 24 hrs. at 1050° F.—
  D+L _____ 23.6
Activity after treatment at 1550° F.—
  D+L _____ 31.1
Activity after treatment at 1700° F.—
  D+L _____ 22.4

Obviously many modifications and variations of the invention as hereinabove set forth may be made without departing from the essence and scope thereof and only such limitations should be applied as are indicated in the appended claims.

What is claimed is:

1. A process for preparing a silica-alumina cracking catalyst which comprises providing an aqueous sodium silicate solution having a silica to sodium oxide mole ratio of about 3:1 to 3.4:1, heating said solution to a temperature of about 80–150° F., cogelling the silicate solution with a slurry containing aluminum sulfate and aluminum trihydrate in which the mole ratio of sulfate ions to alumina expressed as $Al_2O_3$ is 1.5:1 in an amount sufficient to react with the sodium silicate present in the mixture to give a pH of about 5 and purifying and drying the resulting composite.

2. A process for preparing a silica-alumina hydrocarbon cracking catalyst which comprises providing an aqueous sodium silicate solution having a silica to sodium oxide mole ratio of about 3:1 to 3.4:1, heating said solution to a temperature of about 80–150° F., cogelling said solution with an luminous slurry containing aluminum sulfate and aluminum trihydrate in which the mole ratio of sulfate ions to alumina expressed as $Al_2O_3$ is 1.5:1 in an amount sufficient to react substantially completely with the sodium silicate to give a pH of about 5 and thereby cogel the silica from the sodium silicate with the alumina from the aluminous slurry and purifying and drying the silica-alumina composite.

3. A process for preparing a silica-alumina hydrocarbon crack catalyst which contains about 25% active alumina which comprises providing an aqueous sodium silicate solution having a silica to sodium oxide mole ratio of 3.3:1, cogelling with an aluminous slurry containing aluminum sulfate and aluminum trihydrate in which the mole ratio of sulfate ion to alumina expressed as $Al_2O_3$ is 1.5:1 in an amount sufficient to react substantially completely with the sodium silicate solution and give a pH of about 5 thereby cogelling the silica from said solution with the alumina from the aluminous slurry, filtering the resulting composite, reslurrying the solids with water, spray drying the slurry and washing and redrying the resulting particles.

4. A process for preparing a silica-alumina hydrocarbon cracking catalyst which comprises providing an aqueous sodium silicate solution having a silica to sodium oxide mole ratio of 3.3:1, cogelling said solution with an aluminous slurry containing aluminum sulfate and aluminum trihydrate in which the mole ratio of sulfate ions to alumina expressed as $Al_2O_3$ is 1.5:1 in an amount sufficient to react substantially completely with the sodium silicate solution and give a pH of about 5.0 thereby cogel the silica from the sodium silicate slurry with the alumina from the aluminous slurry adjusting the pH to about 5.8, filtering the composite, reslurrying the solids with water, spray drying the slurry, washing the slurry to remove impurities and redrying the resulting particles.

References Cited in the file of this patent

UNITED STATES PATENTS

| | | |
|---|---|---|
| 2,326,706 | Thomas et al. | Aug. 10, 1943 |
| 2,474,888 | Connolly | July 5, 1949 |
| 2,548,860 | Bond | Apr. 17, 1951 |
| 2,595,339 | Herder et al. | May 6, 1952 |
| 2,777,822 | Wilson | Apr. 27, 1953 |
| 2,844,523 | Veltman et al. | July 22, 1958 |